US012762759B2

(12) United States Patent
Shiraga

(10) Patent No.: US 12,762,759 B2
(45) Date of Patent: Oct. 13, 2026

(54) INFORMATION PROCESSING DEVICE, AND GENERATION METHOD

(71) Applicant: MITSUBISHI ELECTRIC CORPORATION, Tokyo (JP)

(72) Inventor: Takeru Shiraga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 126 days.

(21) Appl. No.: 18/975,752

(22) Filed: Dec. 10, 2024

(65) Prior Publication Data

US 2025/0104296 A1 Mar. 27, 2025

Related U.S. Application Data

(63) Continuation of application No. PCT/JP2022/026814, filed on Jul. 6, 2022.

(51) Int. Cl.
*G06T 11/00* (2026.01)
*G06T 3/40* (2024.01)
(Continued)

(52) U.S. Cl.
CPC ................ *G06T 11/00* (2013.01); *G06T 3/40* (2013.01); *G06T 7/11* (2017.01); *G06T 7/194* (2017.01);
(Continued)

(58) Field of Classification Search
CPC ... G06T 11/00; G06T 3/40; G06T 7/11; G06T 7/194; G06T 7/74; G06T 2207/30244; G06T 2210/56; G06T 7/33; G06V 10/774
See application file for complete search history.

(56) References Cited

U.S. PATENT DOCUMENTS

2016/0132755 A1* 5/2016 Ikeda ..................... G06N 20/00
2018/0253894 A1* 9/2018 Krishnan ................ G06T 15/08
(Continued)

FOREIGN PATENT DOCUMENTS

CN 115705660 A * 2/2023 ............... G06T 5/50
CN 115147262 B * 7/2025 ............... G06T 3/14
(Continued)

OTHER PUBLICATIONS

International Search Report for PCT/JP2022/026814 mailed on Sep. 20, 2022.
(Continued)

*Primary Examiner* — Temesghen Ghebretinsae
(74) *Attorney, Agent, or Firm* — Birch, Stewart, Kolasch & Birch, LLP

(57) ABSTRACT

An information processing device includes an acquisition unit that acquires a foreground image associated with an angle θ and indicating a target object, a background image, point cloud data, and a camera position when the background image was generated, a superimposition position determination unit that determines a superimposition position in the background image, a calculation unit that calculates a plane as a region including the superimposition position by using the point cloud data and calculates an angle $\theta_B$ as an angle between a straight line connecting the camera position and the superimposition position and the calculated plane, and a superimposition unit that superimposes the foreground image on the background image. The angle θ is an angle between a plane on which the target object was set and a straight line representing an image capturing direction, and is an angle equal to or close to the angle $\theta_B$.

5 Claims, 20 Drawing Sheets

(51) Int. Cl.
*G06T 7/11* (2017.01)
*G06T 7/194* (2017.01)
*G06T 7/73* (2017.01)

(52) U.S. Cl.
CPC ...... *G06T 7/74* (2017.01); *G06T 2207/30244* (2013.01); *G06T 2210/56* (2013.01)

(56) References Cited

U.S. PATENT DOCUMENTS

| | | | | |
|---|---|---|---|---|
| 2021/0342572 | A1* | 11/2021 | Miyamoto | G06T 7/194 |
| 2026/0075159 | A1* | 3/2026 | Pipher | H04N 5/272 |

FOREIGN PATENT DOCUMENTS

| | | | | | |
|---|---|---|---|---|---|
| JP | 2002-511175 | A | | 4/2002 | |
| JP | 2014-178957 | A | | 9/2014 | |
| JP | 2019175446 | A | * | 10/2019 | H04N 23/54 |
| WO | WO 99/49414 | A1 | | 9/1999 | |
| WO | WO 2020/075252 | A1 | | 4/2020 | |
| WO | WO 2020/152763 | A1 | | 7/2020 | |
| WO | WO-2023015868 | A1 | * | 2/2023 | G06T 7/80 |
| WO | WO-2026053445 | A1 | * | 3/2026 | G01C 3/06 |

OTHER PUBLICATIONS

German Office Action for German Application No. 11 2022 007 192.3, dated May 9, 2025, with English translation.

* cited by examiner

FIG. 9

111

| MEASUREMENT TABLE | | | | | | | | |
|---|---|---|---|---|---|---|---|---|
| TARGET OBJECT ID | MEASUREMENT ID | FRAME NUMBER | IMAGE | CAMERA POSITION POSTURE | TARGET OBJECT SETTING POINT | TARGET OBJECT SETTING PLANE | ANGLE | FOREGROUND IMAGE |
| A1 | B1 | C1 | D1 | E1 | F1 | G1 | H1 | I1 |
| A1 | B2 | C2 | D2 | E2 | F2 | G2 | H2 | I2 |
| ... | ... | ... | ... | ... | ... | ... | ... | ... |

INFORMATION PROCESSING DEVICE, AND GENERATION METHOD

CROSS-REFERENCE TO RELATED APPLICATION

This application is a continuation application of International Application No. PCT/JP2022/026814 having an international filing date of Jul. 6, 2022.

BACKGROUND OF THE INVENTION

1. Field of the Invention

The present disclosure relates to an information processing device, and a generation method.

2. Description of the Related Art

It has been known that object recognition is executed by using a learned model. In the learning phase of the learned model, a great amount of images are necessary. It is possible to prepare a great amount of images including a general target object such as a person, a car or an animal. For example, by using an open source, it is possible to prepare a great amount of images including a general target object. However, it is difficult to prepare a great amount of images of a particular target object such as a particular car, facility or product. Further, when the posture of the target object changes, it is difficult to prepare a great amount of images of target objects in various postures. In such a circumstance, a technology for generating images has been proposed (see Patent Reference 1). An information processing device in the Patent Reference 1 acquires three-dimensional information including a plurality of images, selects a recognition target from the three-dimensional information, generates a plurality of foreground images from the plurality of images by extracting an image of a recognition target range as a range corresponding to the selected recognition target from each of the plurality of images, and generates a plurality of combined images by combining each of the plurality of foreground images with each of a plurality of background images.

Patent Reference 1: WO 2020/152763

Incidentally, when a foreground image is superimposed on a background image, there are cases where realistic data is not generated since no restrictions have been placed. For example, an image in which the target object is arranged at an unrealistic angle or the like is generated. When such images are used as the learning data, recognition accuracy of the learned model decreases.

SUMMARY OF THE INVENTION

An object of the present disclosure is to generate realistic data.

An information processing device according to an aspect of the present disclosure is provided. The information processing device includes an acquisition unit that acquires a foreground image associated with a foreground image angle and indicating a target object, a background image, point cloud data representing three-dimensional coordinates corresponding to each pixel of the background image, and a camera position when the background image was generated, a superimposition position determination unit that determines a superimposition position in the background image, a calculation unit that calculates a plane as a region including the superimposition position by using the point cloud data and calculates a background image angle as an angle between a straight line connecting the camera position and the superimposition position and the calculated plane, and a superimposition unit that superimposes the foreground image on the background image. The foreground image angle is an angle between a plane on which the target object was set when an original image of the foreground image was generated and a straight line representing an image capturing direction as a direction in which the image of the target object is captured, and is an angle equal to or close to the background image angle.

According to the present disclosure, realistic data can be generated.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 9 is a diagram showing an example of a measurement table;

DETAILED DESCRIPTION OF THE INVENTION

An embodiment will be described below with reference to the drawings. The following embodiment is just an example and a variety of modifications are possible within the scope of the present disclosure.

Embodiment

Figure 1:
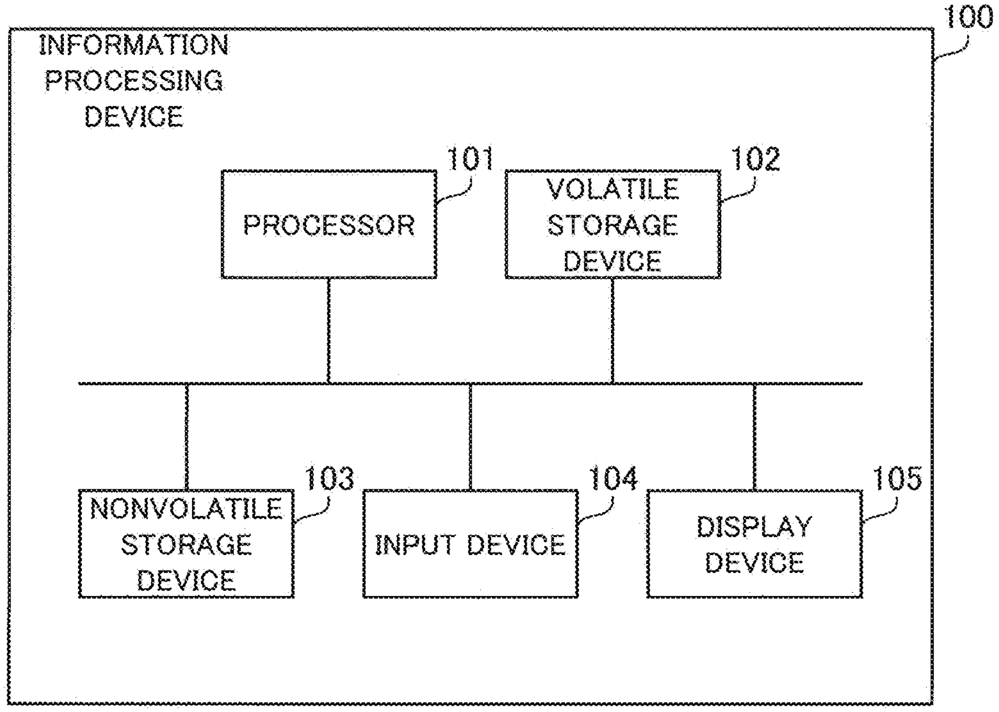
FIG. 1 is a diagram showing hardware included in an information processing device.

FIG. 1 is a diagram showing hardware included in an information processing device. The information processing device 100 is a device that executes a generation method. The information processing device 100 is a server, a Personal Computer (PC), a smartphone or the like, for example.

The information processing device 100 includes a processor 101, a volatile storage device 102, a nonvolatile storage device 103, an input device 104 and a display device 105. It is permissible even if the input device 104 and the display device 105 exist outside the information processing device 100.

The processor 101 controls the whole of the information processing device 100. The processor 101 is a Central Processing Unit (CPU), a Field Programmable Gate Array (FPGA), a Graphics Processing Unit (GPU) or the like, for example. The processor 101 can also be a multiprocessor. Further, the information processing device 100 may include processing circuitry.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

The input device 104 is a keyboard, a touch panel or the like. The display device 105 is a display.

Next, functions of the information processing device 100 will be described below.

Figure 2:
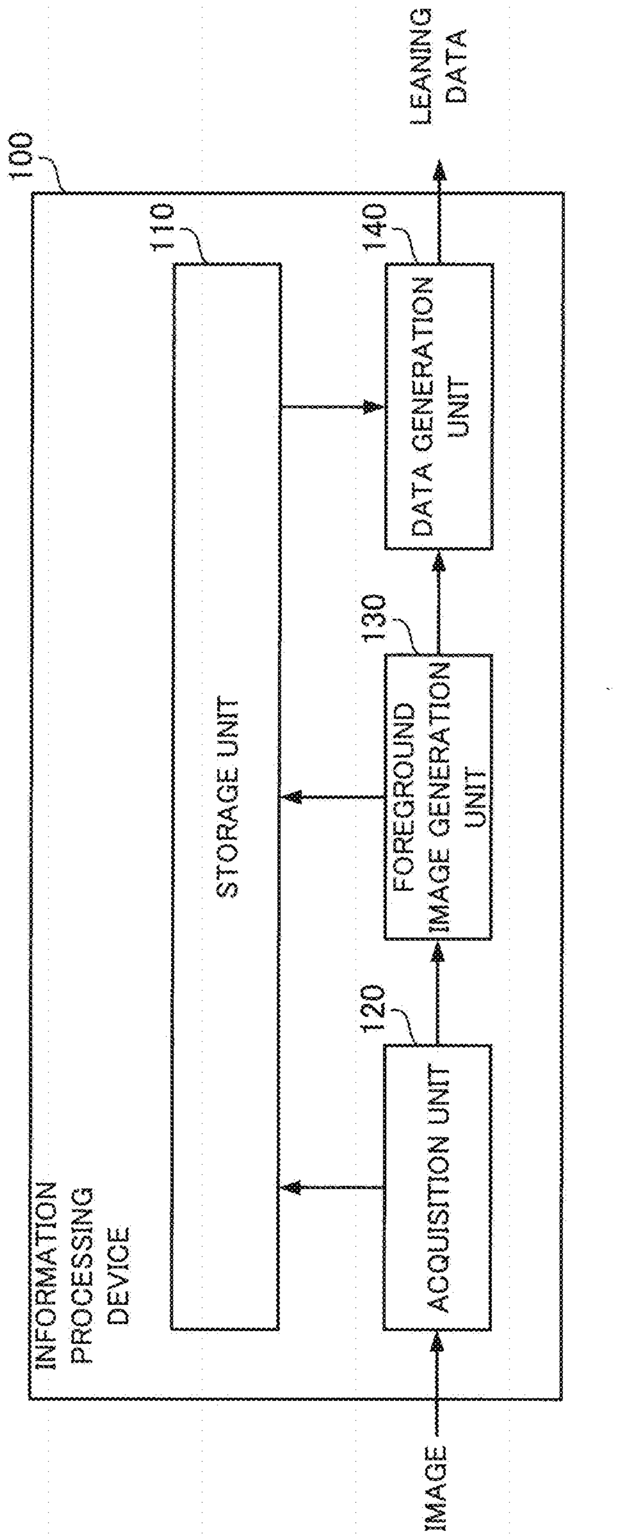
FIG. 2 is a block diagram showing functions of the information processing device.

FIG. 2 is a block diagram showing the functions of the information processing device. The information processing device 100 includes a storage unit 110, an acquisition unit 120, a foreground image generation unit 130 and a data generation unit 140.

The storage unit 110 may be implemented as a storage area reserved in the volatile storage device 102 or the nonvolatile storage device 103.

Part or all of the acquisition unit 120, the foreground image generation unit 130 and the data generation unit 140 may be implemented by processing circuitry. Further, part or all of the acquisition unit 120, the foreground image generation unit 130 and the data generation unit 140 may be implemented as modules of a program executed by the processor 101. For example, the program executed by the processor 101 is referred to also as a generation program. The generation program has been recorded in a record medium, for example.

The storage unit 110 stores a variety of information. For example, the storage unit 110 stores a measurement table. The measurement table will be described later.

The acquisition unit 120 acquires images including a target object 20. For example, the acquisition unit 120 acquires the images from a camera. The camera is a Red Green Blue-Depth (RGB-D) camera, for example. In cases where the camera is an RGB camera, the acquisition unit 120 may acquire the images from a combination of the RGB camera and a sensor (e.g., an Inertial Measurement Unit (IMU) sensor, an infrared sensor or a Light Detection And Ranging (LiDAR)) capable of measuring the distance between the RGB camera and the target object 20.

It is also possible for the acquisition unit 120 to acquire the images including the target object 20 from an external device. The external device is a cloud server, for example. Incidentally, illustration of the external device is left out.

Here, an example of a target object image capturing method will be described below.

Figure 3:
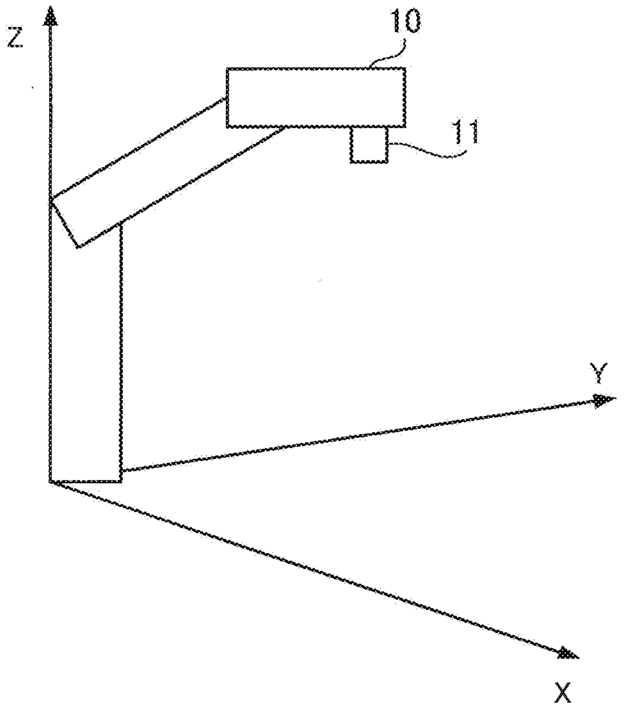
FIG. 3 is a diagram showing an example (No. 1) of a target object image capturing method.

FIG. 3 is a diagram showing an example (No. 1) of the target object image capturing method. FIG. 3 shows a robot arm 10. A camera 11 is attached to an end of the robot arm 10.

For example, an installation position of the robot arm 10 is handled as the origin. The images generated by the camera 11 are processed by using a world coordinate system around the origin.

Figure 4:
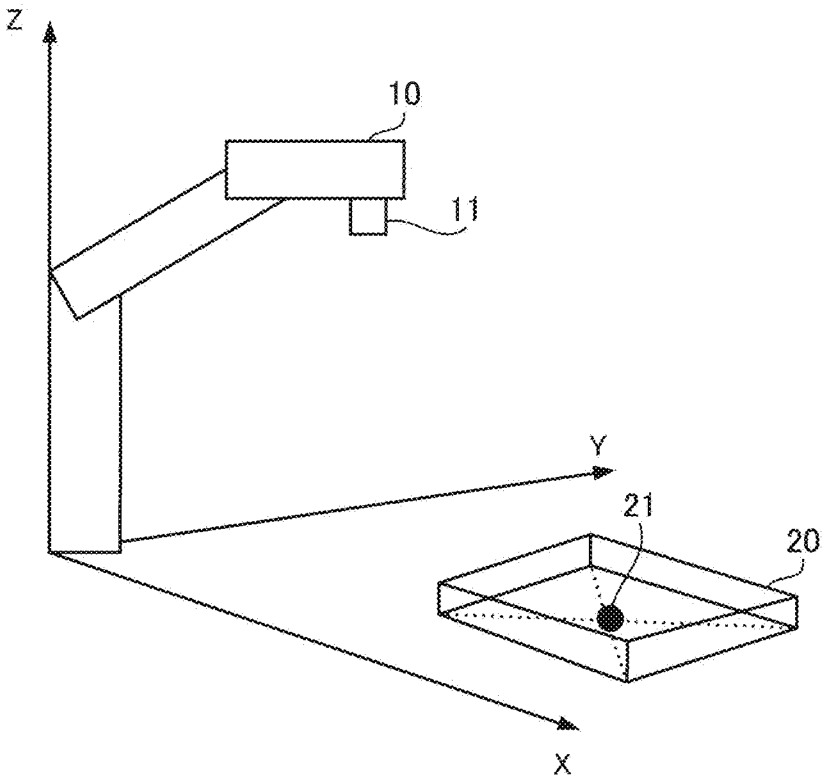
FIG. 4 is a diagram showing an example (No. 2) of the target object image capturing method.

FIG. 4 is a diagram showing an example (No. 2) of the target object image capturing method. FIG. 4 shows the target object 20. The target object 20 is set on a plane on which the robot arm 10 has been installed. FIG. 4 shows a target object setting point 21. The target object setting point 21 is a point in contact with the plane and is a barycenter or center of the target object 20. Thus, the Z-coordinate of the target object setting point 21 is 0. Incidentally, the target object setting point 21 may also be determined before the image capturing. Further, the target object setting point 21 may also be set by making an adjustment so that a central point of the camera 11 and a central point of the target object 20 coincide with each other.

For example, an internal parameter of the camera 11 may be obtained by camera calibration.

Next, two image capturing methods will be described concretely below. First, a first image capturing method will be shown.

Figure 5:
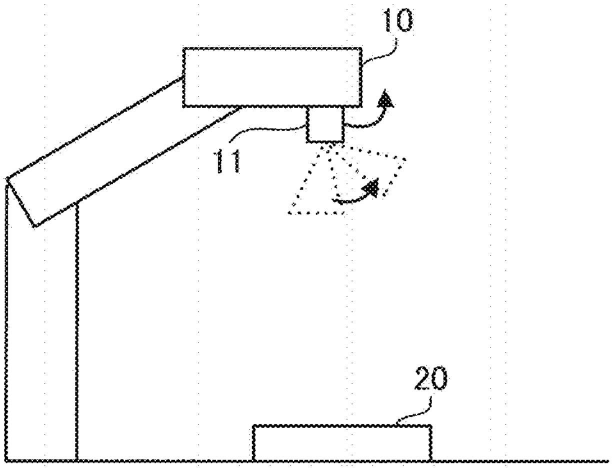
FIG. 5 is a diagram showing an example (No. 3) of the target object image capturing method.

FIG. 5 is a diagram showing an example (No. 3) of the target object image capturing method. The robot arm 10 captures images of the target object 20 from various angles while moving. Further, image capturing timing, an image capturing range and the like may be changed appropriately.

Next, a second image capturing method will be described. In the second image capturing method, the image capturing is performed by using the following method.

Figure 6:
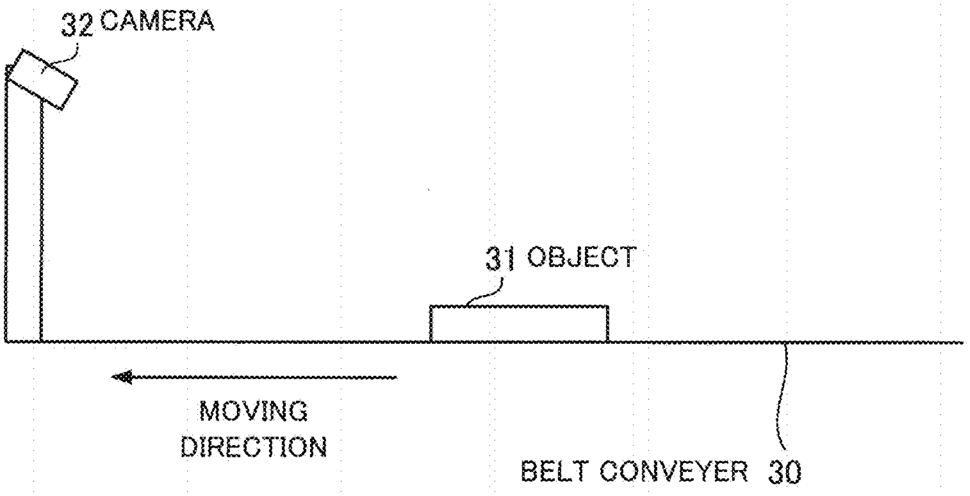
FIG. 6 shows an example in a case where an object moves in a constant direction.

FIG. 6 shows an example in a case where an object moves in a constant direction. FIG. 6 shows a belt conveyer 30. An object 31 has been placed on the belt conveyer 30. The object 31 moves in a constant direction. A camera 32 captures images of the object 31 moving linearly. Images of the target object 20 are captured by using such an image capturing method. The method will be described concretely below by using FIG. 7.

Figure 7:
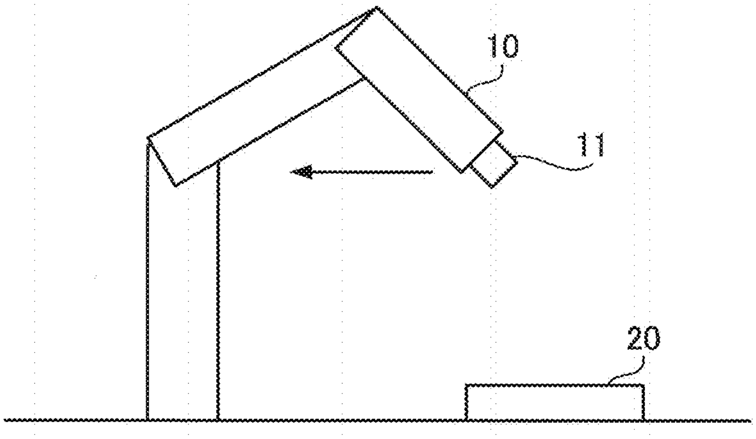
FIG. 7 is a diagram showing an example (No. 4) of the target object image capturing method.

FIG. 7 is a diagram showing an example (No. 4) of the target object image capturing method. The robot arm 10 captures images of the target object 20 while moving linearly.

By the above-described image capturing of the target object 20, the information processing device 100 is capable of acquiring images including the target object 20. Incidentally, the image capturing method for the target object 20 can also be a method other than the above-described methods.

Further, the acquisition unit 120 acquires camera position posture based on the world coordinate system. The camera position posture is represented by an external parameter matrix ((R|T)). For example, the camera position posture may be calculated by using camera calibration.

Furthermore, the acquisition unit 120 acquires an angle θ between a straight line passing through the camera 11 and a straight line passing through the target object setting point 21. The angle θ will be shown below.

Figure 8:
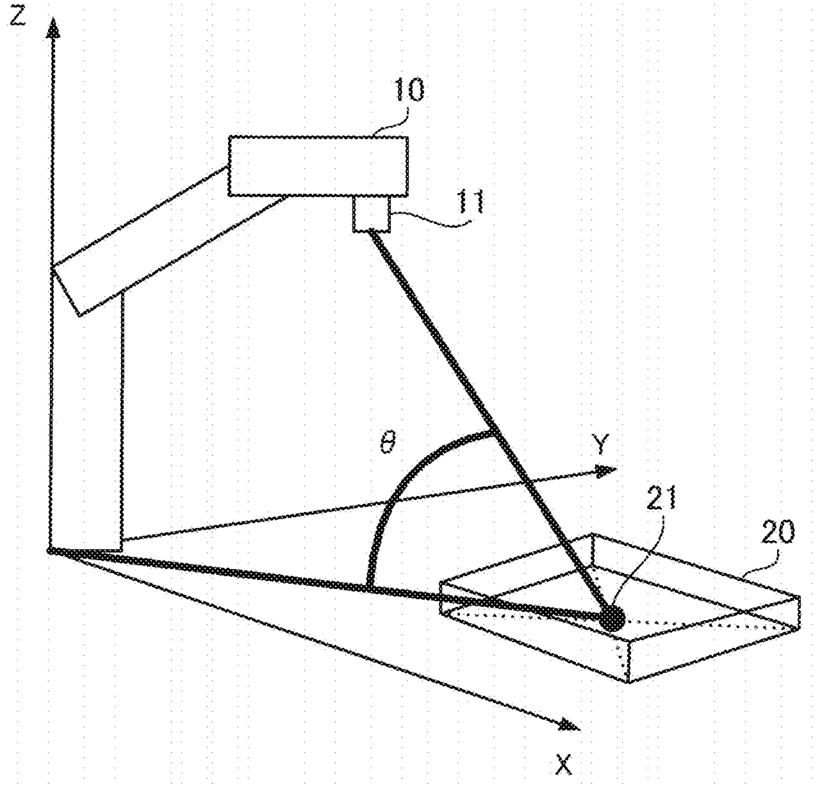
FIG. 8 is a diagram showing an example of an angle $\theta$.

FIG. 8 is a diagram showing an example of the angle θ. FIG. 8 shows the angle θ. The acquisition unit 120 acquires the angle θ. The angle θ may be represented as follows. The angle θ is an angle between the plane on which the target object 20 was set when the image was generated and a straight line representing an image capturing direction as a direction in which the image of the target object 20 is captured.

The acquisition unit 120 registers each image, the camera position posture, the target object setting point, the target object setting plane and the angle θ in the measurement table. The measurement table will be shown below.

FIG. 9 is a diagram showing an example of the measurement table. The measurement table 111 is stored in the storage unit 110. The measurement table 111 includes items of target object Identifier (ID), measurement ID, frame number, image, camera position posture, target object setting point, target object setting plane, angle and foreground image.

In the item of target object ID, an identifier of the target object is registered. In the item of measurement ID, an identifier of the measurement is registered. In the item of frame number, a number corresponding to the acquired image is registered. In the item of image, the acquired image is registered. In the item of camera position posture, the acquired camera position posture is registered. In the item of target object setting point, the acquired target object setting point is registered. Incidentally, the acquired target object setting point is represented by three-dimensional coordinates in the world coordinate system. In the item of target object setting plane, the acquired target object setting plane is registered. Incidentally, the acquired target object setting plane can be represented by expression (1).

$$ax+by+cz+d=0 \tag{1}$$

As above, the acquired target object setting plane can be represented by the expression (1). Therefore, in the item of target object setting plane, values of a, b, c and d are registered. For example, (a, b, c, d) is represented as (0, 0, 1, 0).

In the item of angle, the acquired angle θ is registered. In the item of foreground image, a foreground image which will be described later is registered.

Further, the measurement table 111 may include items of illumination condition and camera model ID.

Next, the foreground image generation unit 130 will be described below.

The foreground image generation unit 130 generates the foreground image based on the image. In other words, the foreground image generation unit 130 extracts a region regarding the target object 20 included in the image and generates the extracted region as the foreground image. The foreground image generation unit 130 may generate the foreground image by using a conventional technology. Further, the foreground image generation unit 130 may generate the foreground image by using the following method.

Figure 10:
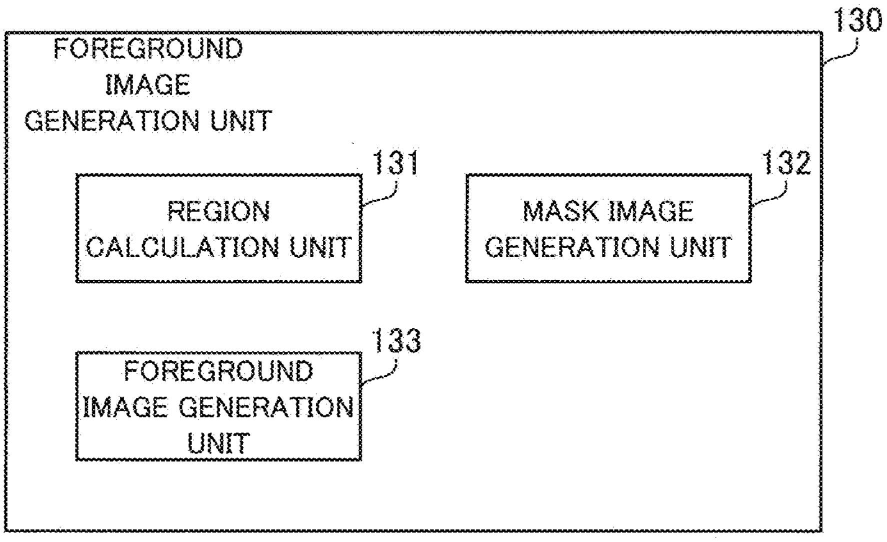
FIG. 10 is a block diagram showing functions of a foreground image generation unit.

FIG. 10 is a block diagram showing functions of the foreground image generation unit. The foreground image generation unit 130 includes a region calculation unit 131, a mask image generation unit 132 and a foreground image generation unit 133.

The region calculation unit 131 calculates coordinates s of the target object 20 in the image. Specifically, the region calculation unit 131 calculates the coordinates s by using expression (2). Incidentally, f represents the frame number. The character $u_f$ represents the number of pixels in a transverse direction. The character $v_f$ represents the number of pixels in a longitudinal direction. K is the internal parameter of the camera. K is represented by a 3×3 matrix. (R|T) is an external parameter matrix. (R|T) is represented by a 3×4 matrix. The character $q_f$ represents a four-dimensional vector ($X_f$, $Y_f$, $Z_f$, 1) obtained by adding 1 to the end of the world coordinates ($X_f$, $Y_f$, $Z_f$) of the target object setting point 21 in the image f.

$$s\begin{pmatrix} u_f \\ v_f \\ 1 \end{pmatrix} = K(R\,|\,t)\,q_f \tag{2}$$

The region calculation unit 131 calculates a rectangular region including the target object 20. For example, the region calculation unit 131 calculates the rectangular region by calculating a plurality of points surrounding the coordinates s of the target object 20 by using size of the target object 20 and the world coordinates of the target object setting point 21.

In the following, examples of the image acquired by the acquisition unit 120 will be shown. Further, examples of the rectangular region will be shown.

Figure 11:
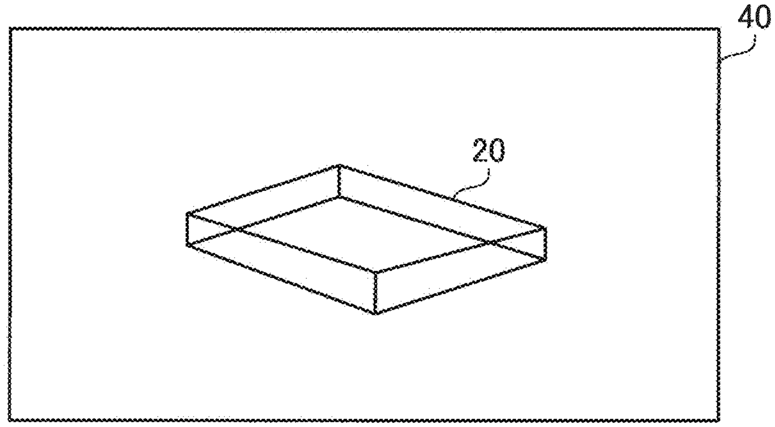
FIG. 11 is a diagram showing an example (No. 1) of an image.

FIG. 11 is a diagram showing an example (No. 1) of the image. FIG. 11 shows an image 40. The image 40 is the image acquired by the acquisition unit 120. The image 40 includes the target object 20.

Figure 12:
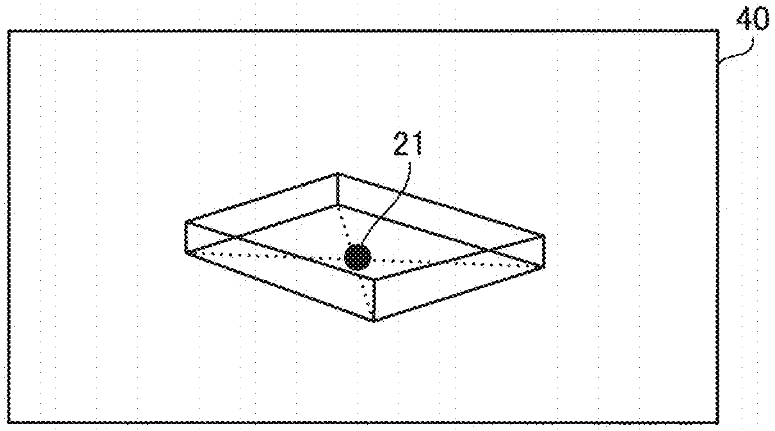
FIGS. 12(A) and 12(B) are diagrams showing an example (No. 2) of the image.
Figure 12:
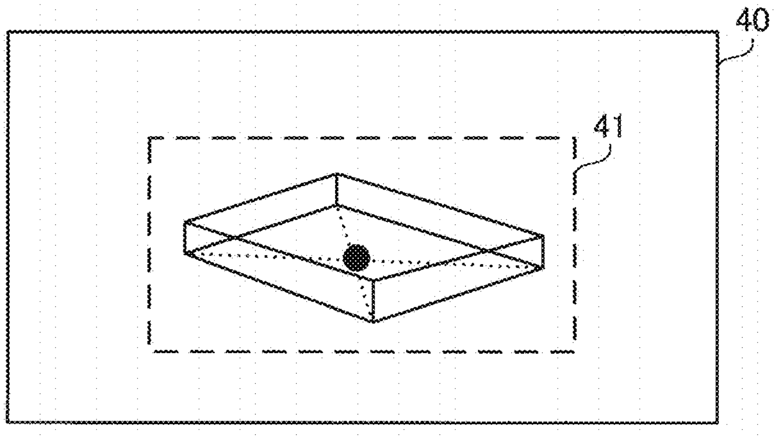

FIGS. 12(A) and 12(B) are diagrams showing an example (No. 2) of the image. FIG. 12(A) shows the target object setting point 21. FIG. 12(B) shows a rectangular region 41.

The mask image generation unit 132 generates a mask image by using the rectangular region. For example, the mask image generation unit 132 calculates a region representing the target object 20 in units of pixels by using algorithm such as GraphCut and generates an image from which the region representing the target object 20 is excluded as the mask image. An example of the mask image will be shown below.

Figure 13:
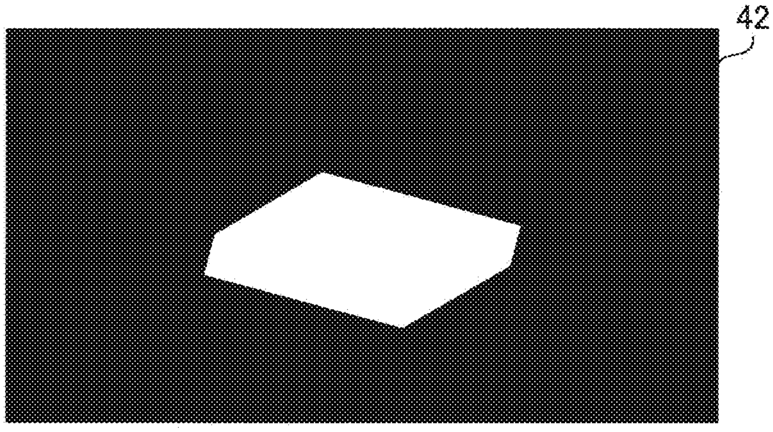
FIGS. 13(A) and 13(B) are diagrams showing an example (No. 3) of the image.
Figure 13:
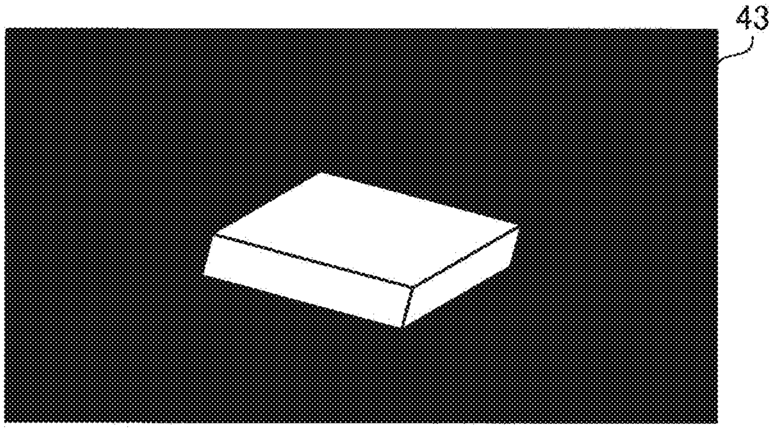

FIGS. 13(A) and 13(B) are diagrams showing an example (No. 3) of the image. FIG. 13(A) shows a mask image 42. The mask image 42 can be represented by a binarized image. For example, the region representing the target object 20 is represented by 1. A region representing a region other than the target object 20 is represented by 0.

The foreground image generation unit 133 generates the foreground image by using the mask image. For example, the foreground image generation unit 133 generates the foreground image by multiplying the value of each pixel of the image 40 by the value of each pixel of the mask image 42. For example, FIG. 13(B) shows a foreground image 43.

The foreground image generation unit 133 registers the foreground image in the measurement table 111.

Next, a process executed by the foreground image generation unit 130 will be described below by using a flowchart.

Figure 14:
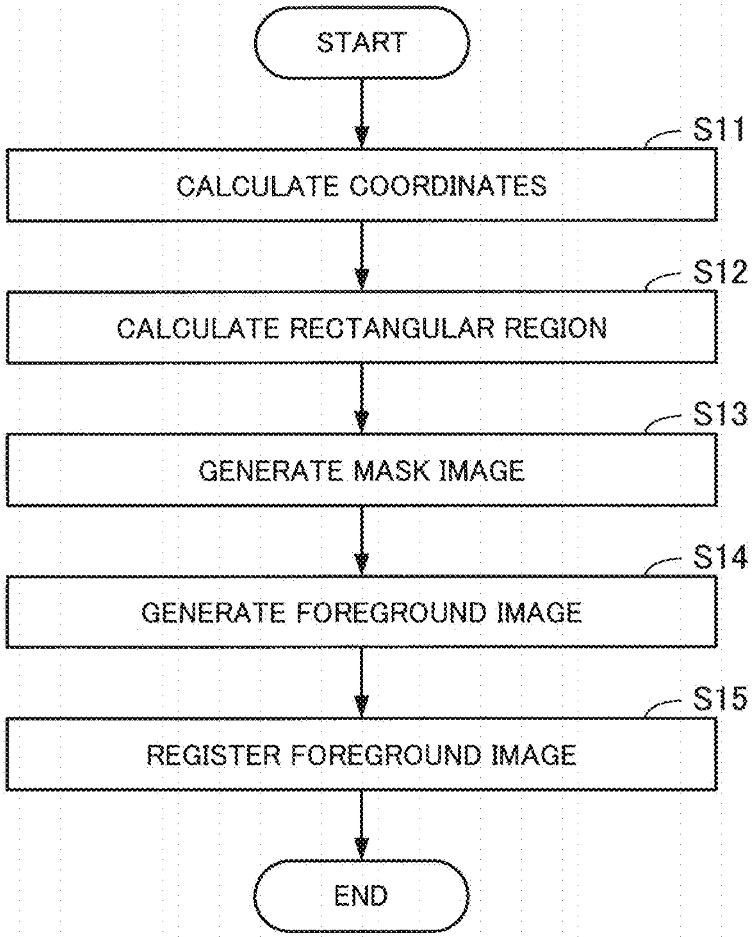
FIG. 14 is a flowchart showing an example of a process executed by the foreground image generation unit.

FIG. 14 is a flowchart showing an example of the process executed by the foreground image generation unit.

(Step S11) The region calculation unit 131 calculates the coordinates s of the target object 20 in the image.

(Step S12) The region calculation unit 131 calculates the rectangular region.

(Step S13) The mask image generation unit 132 generates the mask image by using the rectangular region.

(Step S14) The foreground image generation unit 133 generates the foreground image by using the mask image. The foreground image indicates the target object 20.

(Step S15) The foreground image generation unit 133 registers the foreground image in the measurement table 111.

As shown in the measurement table 111, an angle is associated with the foreground image. This angle is referred to also as a foreground image angle. For example, this angle is the angle θ. This angle is the angle between the plane on which the target object 20 was set when the original image of the foreground image was generated and the straight line representing the image capturing direction as the direction in which the image of the target object 20 is captured.

Incidentally, the process in FIG. 14 may be executed for all the images acquired by the acquisition unit 120.

Next, the data generation unit 140 will be described below.

The data generation unit 140 superimposes the foreground image on the background image. The background image is acquired by the acquisition unit 120. For example, the acquisition unit 120 acquires the background image from the storage unit 110. Further, for example, the acquisition unit 120 acquires the background image from an external device.

Point cloud data representing three-dimensional coordinates corresponding to each pixel of the background image has been associated with the background image. Therefore, when the background image has been acquired, it can be expressed that the point cloud data has been acquired. It is also possible for the acquisition unit 120 to acquire the point cloud data with timing different from the acquisition timing of the background image. The three-dimensional coordinates are represented by a camera coordinate system. The camera coordinate system will be described below.

Figure 15:
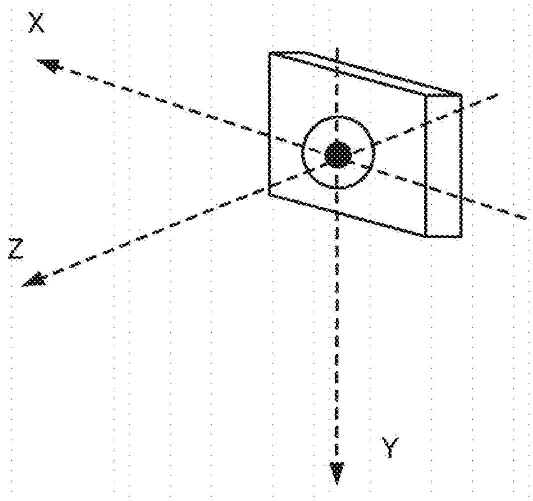
FIG. 15 is a diagram showing an example of a camera coordinate system.

FIG. 15 is a diagram showing an example of the camera coordinate system. In the camera coordinate system, the camera position is used as the origin. The image capturing direction of the camera is the positive direction of the Z-axis.

The camera position when the background image was generated has been associated with the background image. Therefore, when the background image has been acquired, it can be expressed that the camera position has been acquired. It is also possible for the acquisition unit 120 to acquire the camera position at timing different from the acquisition timing of the background image. The camera position is the origin of the camera coordinate system, and thus is represented as (0, 0, 0).

Further, superimposition position information indicating a superimposition position where the foreground image is superimposed on the background image may be associated with the background image.

Next, functions of the data generation unit 140 will be described in detail below.

Figure 16:
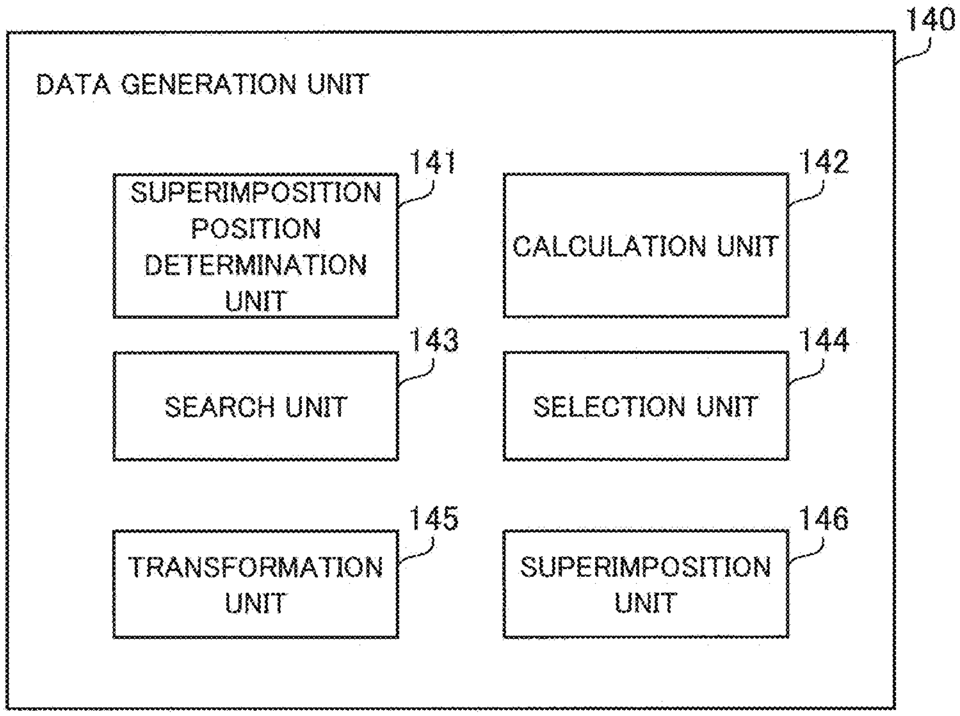
FIG. 16 is a diagram showing functions of a data generation unit.

FIG. 16 is a diagram showing the functions of the data generation unit. The data generation unit 140 includes a superimposition position determination unit 141, a calculation unit 142, a search unit 143, a selection unit 144, a transformation unit 145 and a superimposition unit 146.

A process executed by the superimposition position determination unit 141 and the calculation unit 142 will be described below by using a flowchart.

Figure 17:
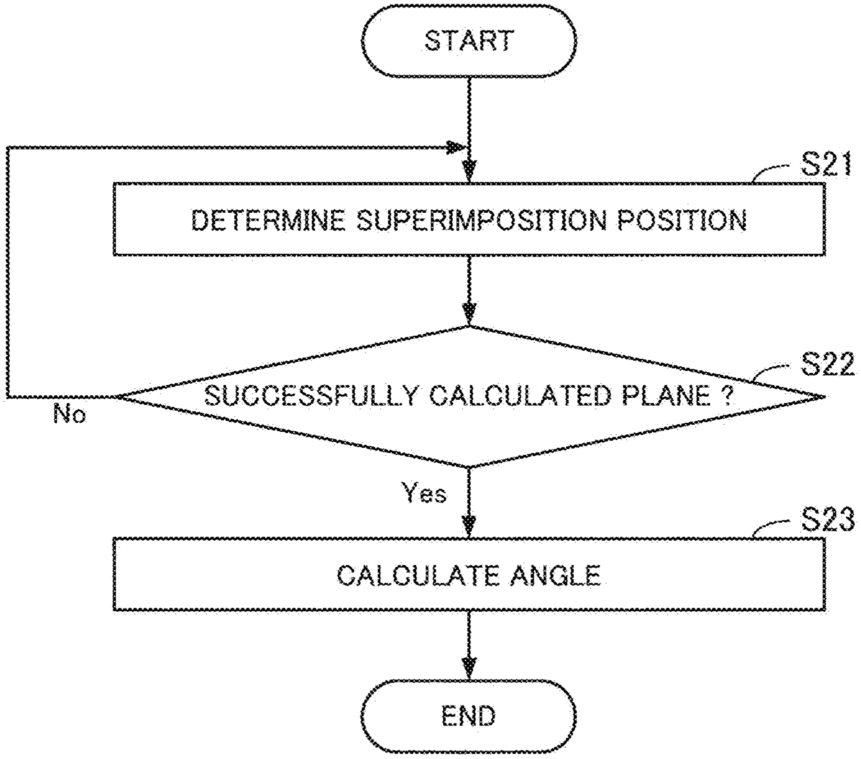
FIG. 17 is a flowchart showing an example (No. 1) of a process executed by a superimposition position determination unit and a calculation unit.

FIG. 17 is a flowchart showing an example (No. 1) of the process executed by the superimposition position determination unit and the calculation unit.

(Step S21) The superimposition position determination unit 141 determines the superimposition position $p_B$ in the background image. The superimposition position $p_B$ is a position corresponding to the target object setting point 21. The superimposition position $p_B$ is represented by three-dimensional coordinates. The superimposition position determination unit 141 may determine the superimposition position $p_B$ randomly. Further, the superimposition position determination unit 141 may determine the superimposition position $p_B$ based on the superimposition position information.

(Step S22) The calculation unit 142 attempts to calculate a region (i.e., plane $P_B$) including the superimposition position $p_B$ by using the point cloud data. For example, the calculation unit 142 attempts to calculate the plane $P_B$ by using the point cloud data and RANSAC algorithm. Incidentally, the plane $P_B$ can be represented by the expression (1).

When the plane $P_B$ is calculated successfully, the process advances to step S23. When the plane $P_B$ is not calculated, the process advances to the step S21. In the step S21, the superimposition position determination unit 141 determines a new superimposition position.

(Step S23) The calculation unit 142 calculates an angle $\theta_B$ between a straight line connecting the camera position and the superimposition position $p_B$ and the plane $P_B$. The angle $\theta_B$ is referred to also as a background image angle.

In cases where a superimposition range has previously been set in the background image, the following process may be executed.

Figure 18:
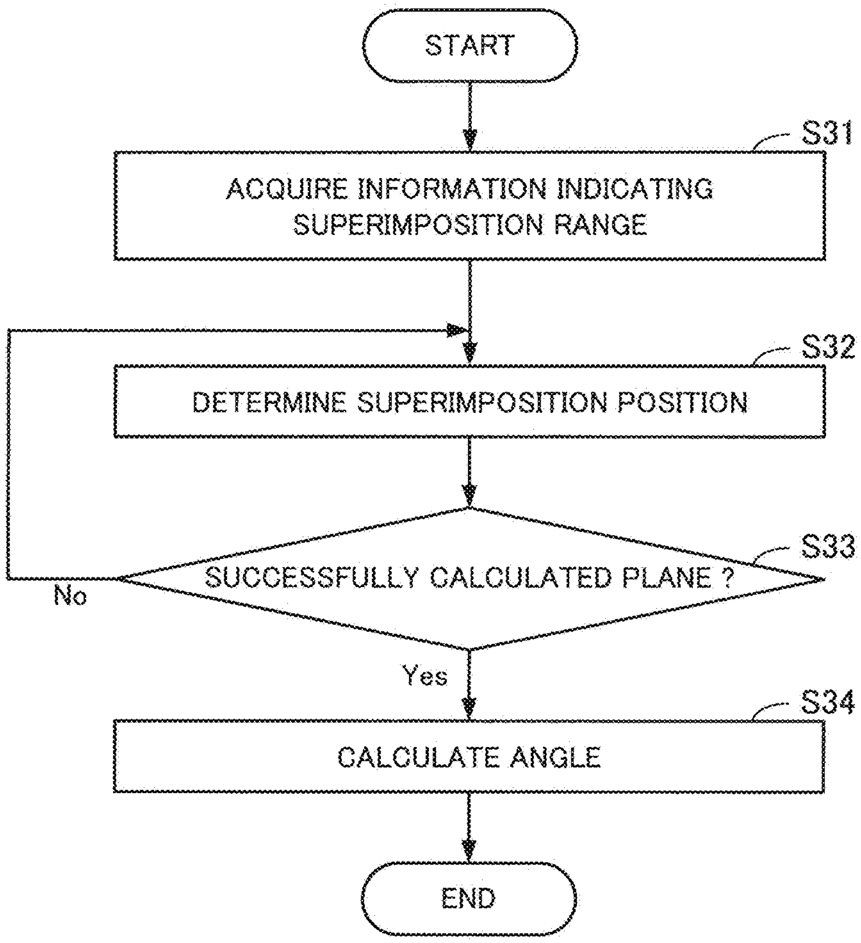
FIG. 18 is a flowchart showing an example (No. 2) of the process executed by the superimposition position determination unit and the calculation unit.

FIG. 18 is a flowchart showing an example (No. 2) of the process executed by the superimposition position determination unit and the calculation unit.

(Step S31) The acquisition unit 120 acquires information indicating the superimposition range. For example, the acquisition unit 120 acquires the information indicating the superimposition range from the storage unit 110.

(Step S32) The superimposition position determination unit 141 determines the superimposition position pp in the superimposition range. For example, the superimposition position determination unit 141 randomly determines the superimposition position pp in the superimposition range.

(Step S33) The calculation unit 142 attempts to calculate the region (i.e., plane $P_B$) including the superimposition position by using the point cloud data. For example, the calculation unit 142 attempts to calculate the plane $P_B$ by using the point cloud data and the RANSAC algorithm.

When the plane $P_B$ is calculated successfully, the process advances to step S34. When the plane $P_B$ is not calculated, the process advances to the step S32. In the step S32, the superimposition position determination unit 141 determines a new superimposition position.

(Step S34) The calculation unit 142 calculates the angle $\theta_B$ between the straight line, connecting the superimposition position $p_B$ and the camera position associated with the background image, and the plane $P_B$.

Next, a process executed by the search unit 143, the selection unit 144, the transformation unit 145 and the superimposition unit 146 will be described below by using a flowchart.

Figure 19:
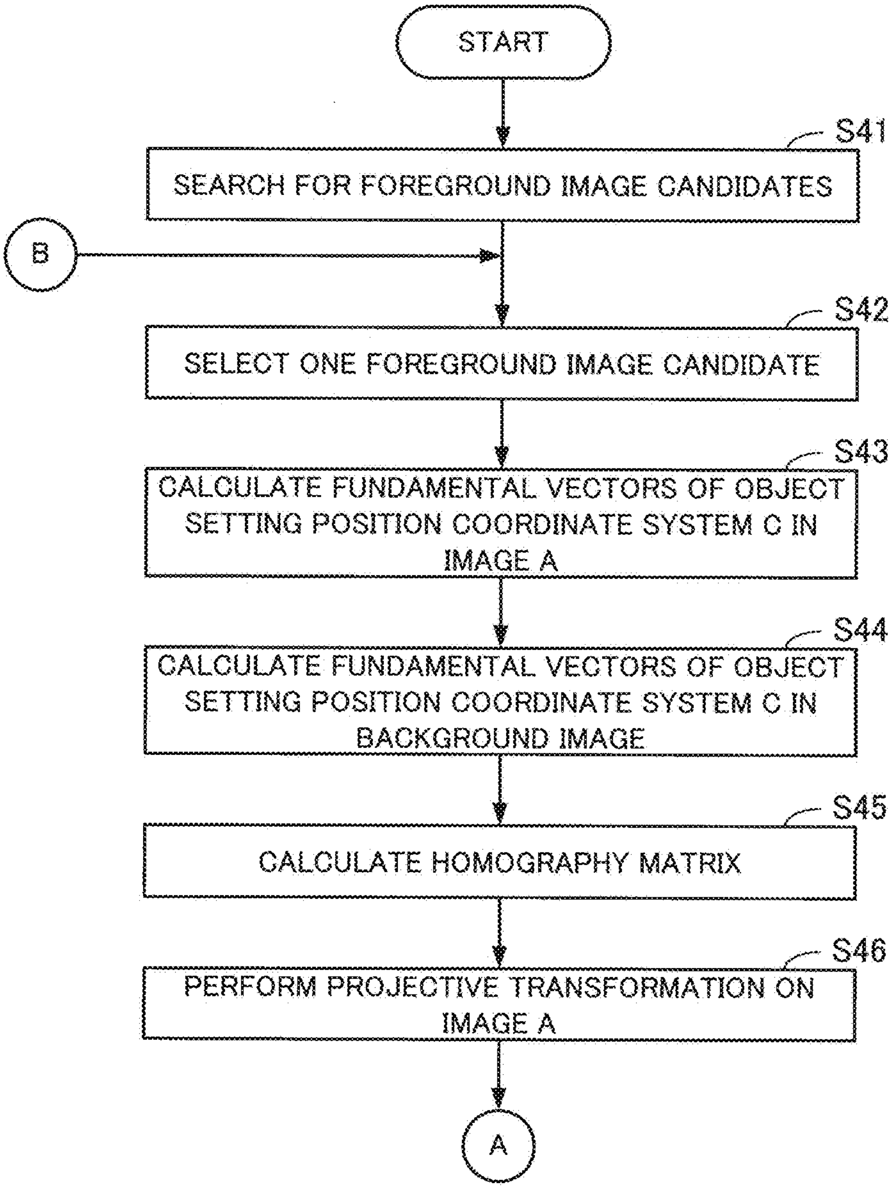
FIG. 19 is a flowchart showing an example (No. 1) of a superimposition process.
Figure 20:
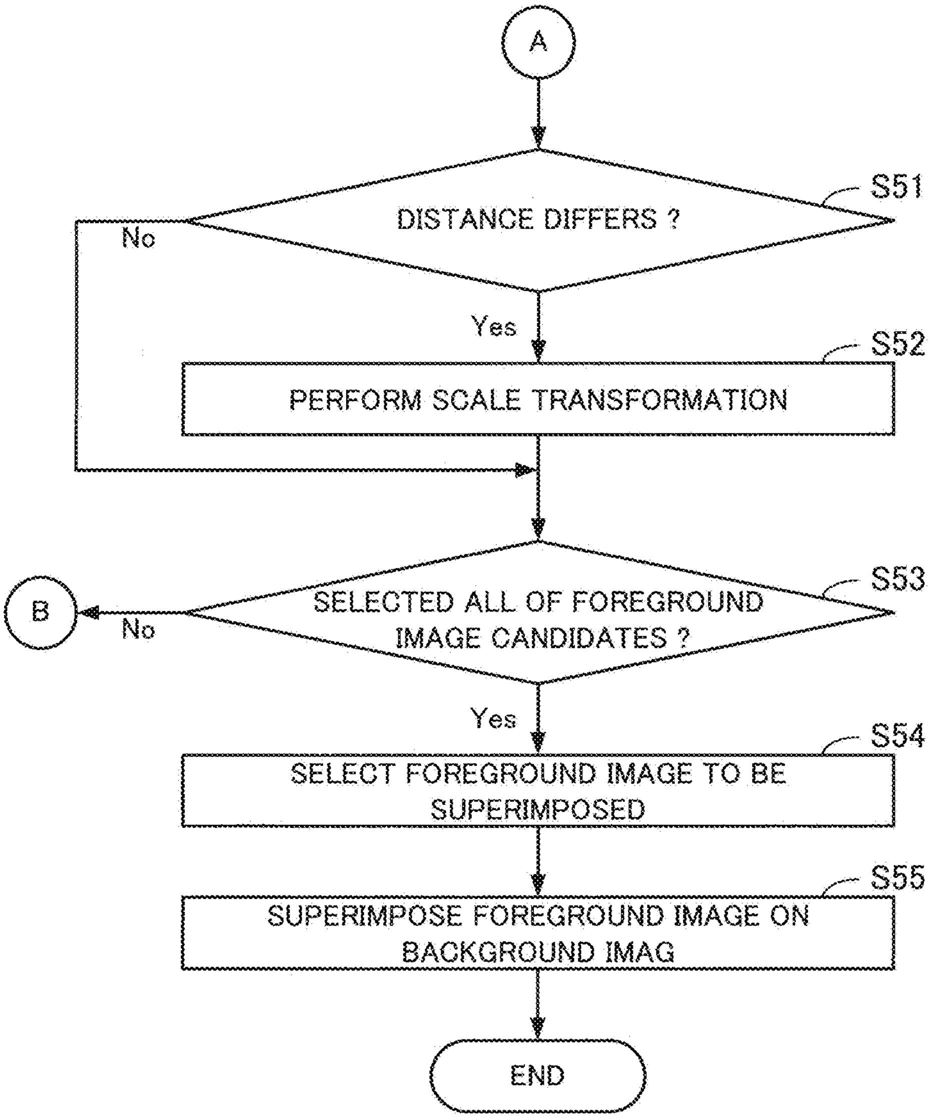
FIG. 20 is a flowchart showing the example (No. 2) of the superimposition process.

FIG. 19 is a flowchart showing an example (No. 1) of a superimposition process. FIG. 20 is a flowchart showing the example (No. 2) of the superimposition process.

(Step S41) The search unit 143 searches the measurement table 111 for candidates for the foreground image based on the angle $\theta_B$ as foreground image candidates. Specifically, the search unit 143 searches for the foreground image candidates by searching the item of angle in the measurement table 111 based on the angle $\theta_B$. Further, it is also possible for the search unit 143 to search for foreground images corresponding to (i.e., associated with) an angle θ satisfying a condition "within a range of the angle $\theta_B \pm 1°$" as the foreground image candidates, for example. By this, one or more foreground image candidates each associated with an angle equal to or close to the angle $\theta_B$ are searched for.

The acquisition unit 120 acquires one or more foreground image candidates (i.e., foreground images) by the search by the search unit 143. It is also possible for the acquisition unit 120 to acquire the one or more foreground image candidates from the external device.

(Step S42) The selection unit 144 selects one foreground image candidate from the one or more foreground image candidates.

Here, even when the angles are equal to or close to each other, the appearance of each foreground image candidate varies if the image capturing direction varies. A case where the appearance varies will be shown concretely below.

Figure 21:
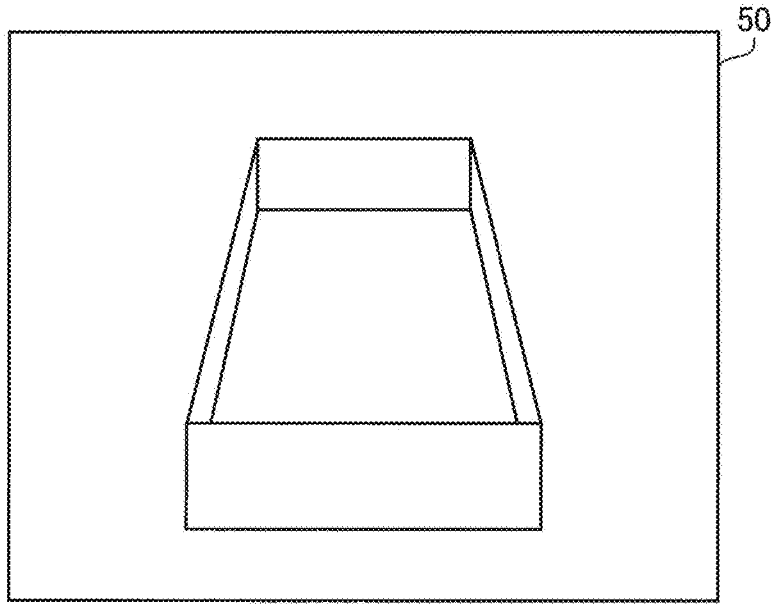
FIGS. 21(A) and 21(B) are diagrams showing an example of a case where appearance varies.
Figure 21:
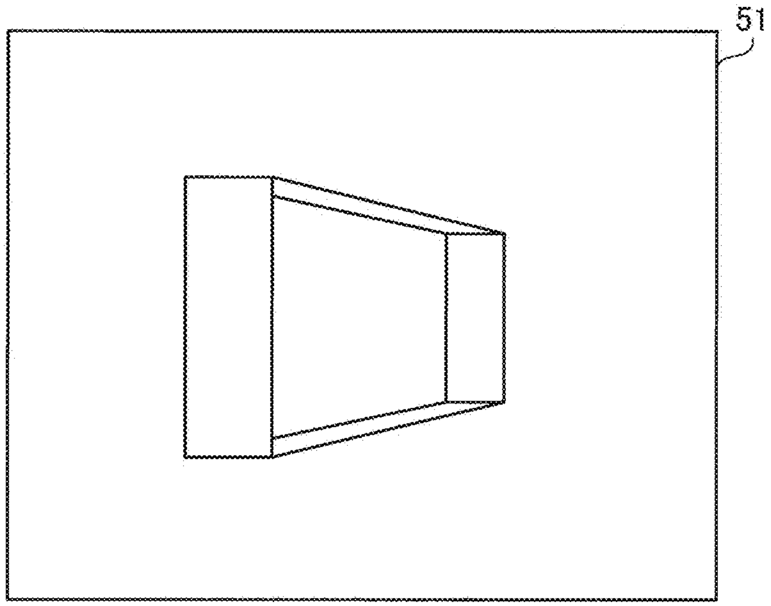

FIGS. 21(A) and 21(B) are diagrams showing an example of the case where the appearance varies. FIG. 21(A) shows an image 50 including the target object 20. FIG. 21(B) shows an image 51 including the target object 20.

The angle θ corresponding to the image 50 and the angle θ corresponding to the image 51 are equal to or close to each other. However, FIGS. 21(A) and 21(B) show a case where the image capturing direction of the target object 20 varies. As shown in FIGS. 21(A) and 21(B), even when the angles are equal to or close to each other, the appearance varies if the image capturing direction varies. Therefore, the transformation unit 145 executes a transformation process.

First, the selected foreground image candidate is referred to as an image A. Here, the camera position posture is represented by the external parameter matrix ((R|T)). The camera posture corresponding to the image A is assumed to be camera posture $R_A$. That is, the camera posture $R_A$ corresponds to "R" in the camera position posture "(R|T)" corresponding to the image A. The target object setting point corresponding to the image A is assumed to be a target object setting point $p_A$. The target object setting plane corresponding to the image A is assumed to be a target object setting plane $P_A$. Further, the superimposition position pp and the plane $P_B$ corresponding to the background image have already been acquired. A camera posture $R_B$ corresponding to the background image is an unknown value.

(Step S43) The transformation unit 145 calculates fundamental vectors of an object setting position coordinate system C in the image A. Here, an example of the object setting position coordinate system C will be shown below.

Figure 22:
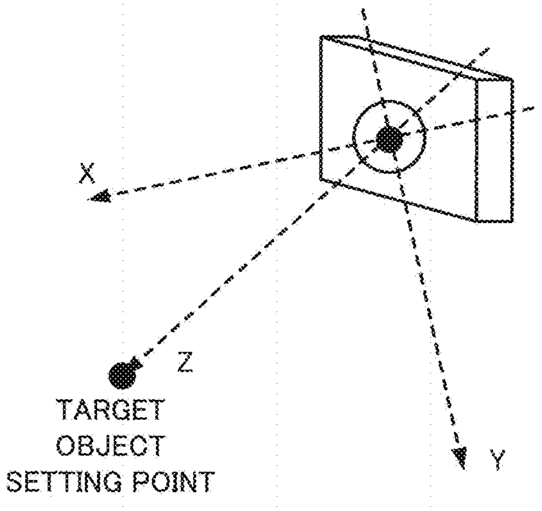
FIG. 22 is a diagram showing an example of an object setting position coordinate system.

FIG. 22 is a diagram showing an example of the object setting position coordinate system. In the object setting position coordinate system C, a vector connecting the camera and the target object setting point is used to define the Z-axis. The transformation unit 145 executes projective transformation so that the camera posture $R_A$ in the object setting position coordinate system C becomes equal to the camera posture $R_B$ in the object setting position coordinate system C.

The calculation of the fundamental vectors of the object setting position coordinate system C in the image A will be described in detail below. Here, the world coordinates of the camera position are assumed to be $O_A$. The world coordinates of the target object setting point $p_A$ are assumed to be $X_A$. The world coordinates of an intersection point between the target object setting plane $P_A$ and a normal vector passing through $O_A$ are assumed to be $Y_A$.

An X-axis direction of the fundamental vectors of the object setting position coordinate system C is represented by expression (3).

$$\vec{x_A} = \begin{bmatrix} \vec{e_{x1}} \\ \vec{e_{x2}} \\ \vec{e_{x3}} \end{bmatrix} = \frac{\overrightarrow{O_A X_A} \times \overrightarrow{O_A Y_A}}{\left|\overrightarrow{O_A X_A} \times \overrightarrow{O_A Y_A}\right|} \tag{3}$$

A Y-axis direction of the fundamental vectors of the object setting position coordinate system C is represented by expression (4).

$$\vec{y_A} = \begin{bmatrix} \vec{e_{y1}} \\ \vec{e_{y2}} \\ \vec{e_{y3}} \end{bmatrix} = \frac{\vec{x_A} \times \vec{z_A}}{\left|\vec{x_A} \times \vec{z_A}\right|} \tag{4}$$

A Z-axis direction of the fundamental vectors of the object setting position coordinate system C is represented by expression (5).

$$\vec{z_A} = \begin{bmatrix} \vec{e_{z1}} \\ \vec{e_{z2}} \\ \vec{e_{z3}} \end{bmatrix} = \frac{\overrightarrow{O_A X_A}}{\left|\overrightarrow{O_A X_A}\right|} \tag{5}$$

(Step S44) The transformation unit 145 calculates fundamental vectors of the object setting position coordinate system C in the background image. Here, the camera position in the camera coordinate system is assumed to be $O_B$. The world coordinates of the superimposition position $p_B$ are assumed to be $X_B$. The world coordinates of an intersection point between the plane $P_B$ and a normal vector passing through $O_B$ are assumed to be $Y_B$.

A X-axis direction of the fundamental vectors of the object setting position coordinate system C is represented by expression (6).

$$\vec{x_B} = \frac{\overrightarrow{O_B X_B} \times \overrightarrow{O_B Y_B}}{\left|\overrightarrow{O_B X_B} \times \overrightarrow{O_B Y_B}\right|} \tag{6}$$

A Y-axis direction of the fundamental vectors of the object setting position coordinate system C is represented by expression (7).

$$\vec{y_B} = \frac{\vec{x_B} \times \vec{z_B}}{\left|\vec{x_B} \times \vec{z_B}\right|} \tag{7}$$

A Z-axis direction of the fundamental vectors of the object setting position coordinate system C is represented by expression (8).

$$\vec{z_B} = \frac{\overrightarrow{O_B X_B}}{|\overrightarrow{O_B X_B}|} \tag{8}$$

A matrix obtained by vertically connecting together the fundamental vectors in the image A is assumed to be $T_A$. $T_A$ is represented by expression (9).

$$T_A = \vec{x_A} + \vec{y_A} + \vec{z_A} \tag{9}$$

A matrix obtained by vertically connecting together the fundamental vectors in the background image is assumed to be $T_B$. $T_B$ is represented by expression (10).

$$T_B = \vec{x_B} + \vec{y_B} + \vec{z_B} \tag{10}$$

A camera posture $R_{A1}$ of the image A in the object setting position coordinate system C is represented by expression (11).

$$R_{A1} = T_A^{-1} R_A \tag{11}$$

A camera posture $R_{B1}$ of the background image in the object setting position coordinate system C is represented by expression (12).

$$R_{B1} = T_B^{-1} \tag{12}$$

A camera posture $R_B$ of the background image in the world coordinate system is represented by expression (13). Further, the camera posture $R_B$ is a rotation matrix.

$$R_B = T_A R_{B1} \tag{13}$$

A transformation matrix $T_{AB}$ of the camera posture is represented by expression (14).

$$T_{AB} = R_B R_A^{-1} \tag{14}$$

(Step S45) The transformation unit 145 calculates a homography matrix $H_{AB}$ by using expression (15). Incidentally, K is an internal parameter matrix of the camera.

$$H_{AB} = K T_{AB} K \tag{15}$$

(Step S46) The transformation unit 145 performs the projective transformation on the image A by using expression (16). Incidentally, the projective transformation in the expression (16) is referred to also as homography transformation. Further, x and y are pixel coordinates of the image A, while $x_{new}$ and $y_{new}$ are pixel coordinates of the image A after the projective transformation.

$$\begin{pmatrix} x_{new} \\ y_{new} \\ 1 \end{pmatrix} = H_{AB} \begin{pmatrix} x \\ y \\ 1 \end{pmatrix} \tag{16}$$

As above, the transformation unit 145 performs the projective transformation on the image A in the image capturing direction in the background image. In other words, the transformation unit 145 performs the projective transformation on the image A in the image capturing direction of the camera that generated the background image.

Further, when the image capturing direction in the background image and the image capturing direction in the image A are the same as each other, the image A does not undergo the projective transformation even if the steps S43 to S46 are executed.

Figure 23:
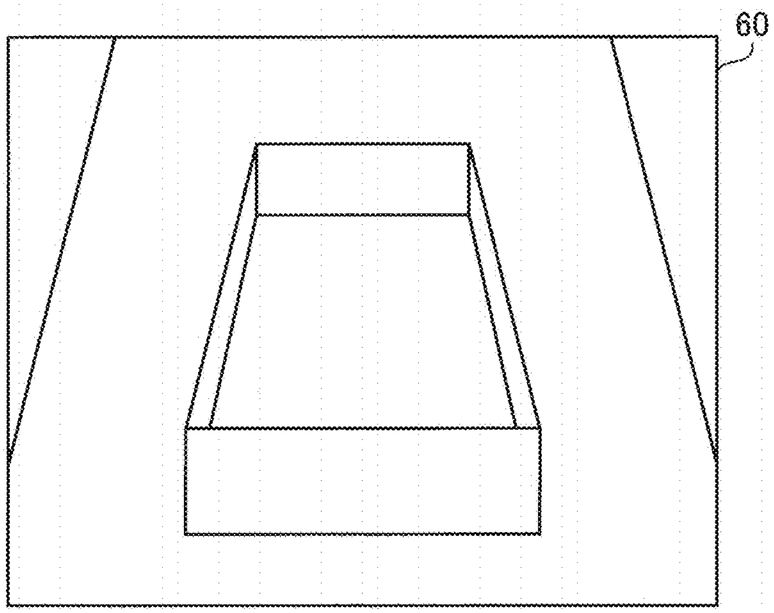
FIGS. 23(A) and 23(B) are diagrams (No. 1) for explaining projective transformation.
Figure 23:
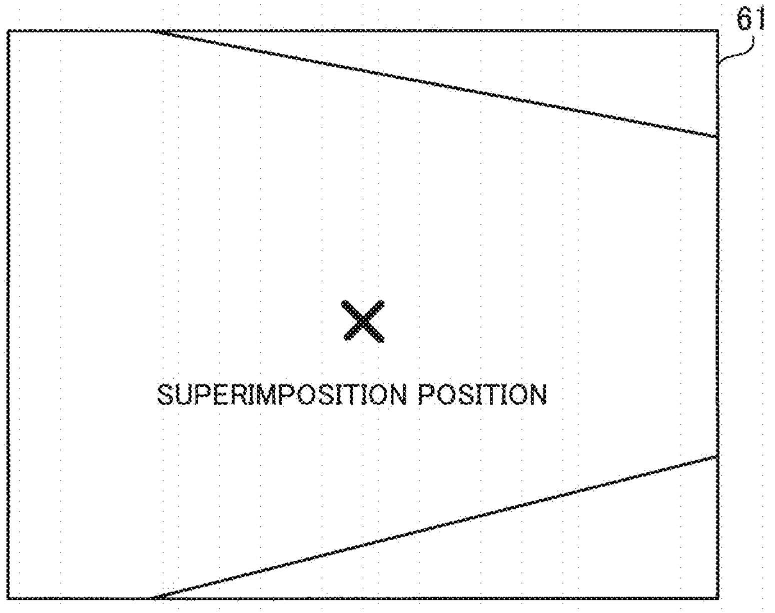

FIGS. 23(A) and 23(B) are diagrams (No. 1) for explaining the projective transformation. FIG. 23(A) shows an image 60 as the image A. FIG. 23(B) shows an image 61 as the background image.

The angle θ corresponding to the image 60 and the angle $\theta_B$ corresponding to the image 61 are equal to each other. However, the image capturing direction corresponding to the image 60 and the image capturing direction corresponding to the image 61 differ from each other by 90 degrees. Thus, the appearance differs from each other. Therefore, the transformation unit 145 performs the projective transformation on the image A.

Figure 24:
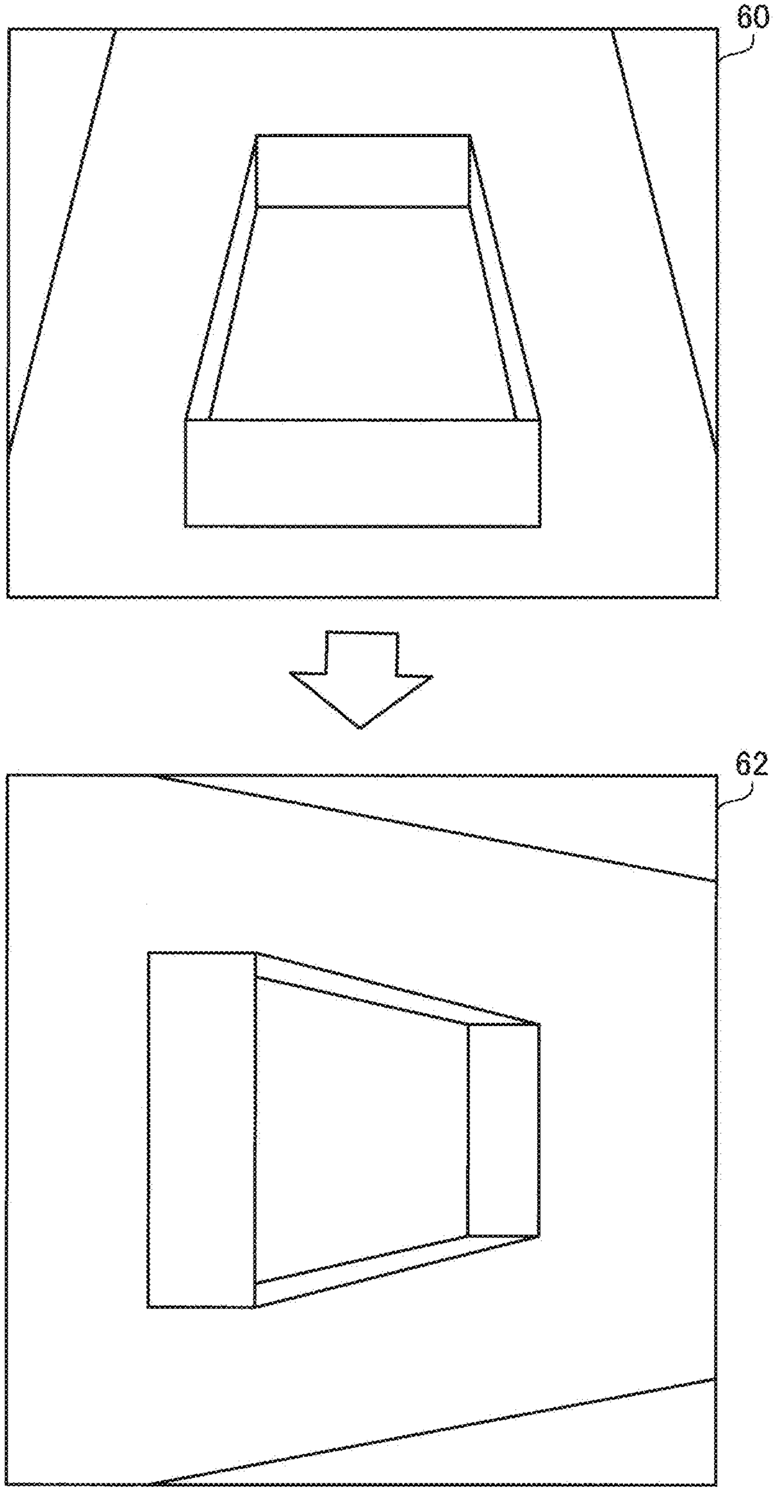
FIG. 24 is a diagram (No. 2) for explaining the projective transformation.

FIG. 24 is a diagram (No. 2) for explaining the projective transformation. FIG. 24 shows an image 62 as the image A after undergoing the projective transformation. As above, by the projective transformation, the appearance of the foreground image becomes the same as the appearance of the background image.

After the step S46, the process advances to step S51.

(Step S51) The transformation unit 145 judges whether or not the distance between the camera and the target object setting plane differs between the image A and the background image. Here, for example, the original image of the foreground image as the image A is an image generated by an RGB-D camera. Therefore, a distance has been associated with each pixel of the image A (i.e., the foreground image). Further, the point cloud data corresponding to each pixel of the background image has been associated with the background image. Therefore, the distance is determined by the Z-coordinate represented by the point cloud data.

When the distance differs between the image A and the background image, it means that the scale differs between the image A and the background image. When the distance differs between the image A and the background image, the process advances to step S52. When the distance is equal in the image A and the background image, the process advances to step S53.

(Step S52) The transformation unit 145 performs scale transformation on the image A.

The scale transformation will be described in detail below. First, the distance in the image A (i.e., distance between the camera position and an intersection point between the target object setting plane $P_A$ and a vector representing the image capturing direction) is assumed to be $d_A$. The distance in the background image (i.e., distance between the camera position and an intersection point between the plane $P_B$ and a vector representing the image capturing direction) is assumed to be $d_B$. Further, in the following description, the image A is assumed to have undergone the projective transformation.

The transformation unit 145 performs the scale transformation on the image A by using affine transformation. Specifically, the transformation unit 145 performs the scale transformation on the image A by using expression (17).

$$\begin{pmatrix} x_{scale\_new} \\ y_{scale\_new} \\ 1 \end{pmatrix} = \begin{pmatrix} \frac{d_A}{d_B} & 0 & 0 \\ 0 & \frac{d_A}{d_B} & 0 \\ 0 & 0 & 1 \end{pmatrix} \begin{pmatrix} x_{new} \\ y_{new} \\ 1 \end{pmatrix} \tag{17}$$

Here, an example of the image A after undergoing the scale transformation will be shown below.

Figure 25:
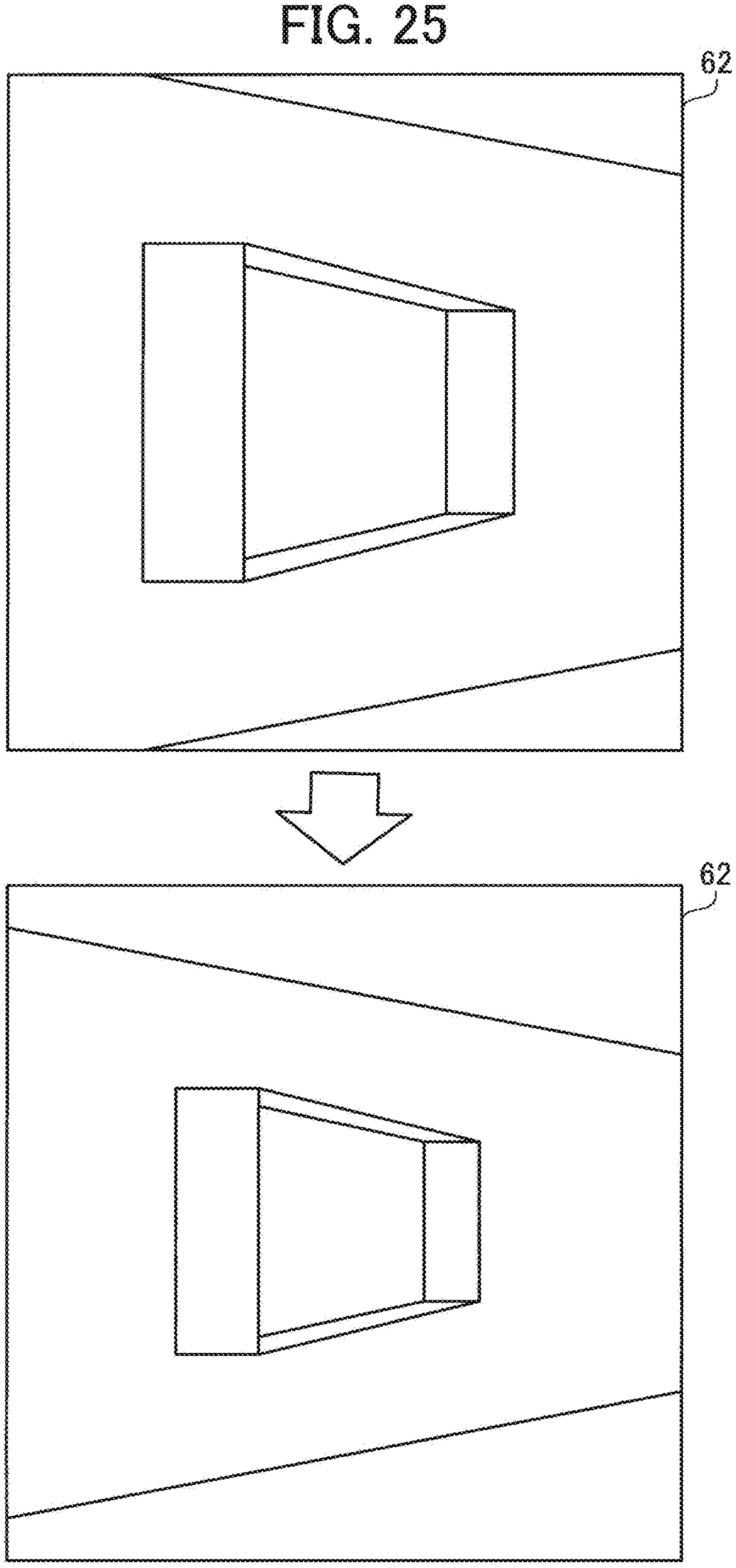
FIG. 25 is a diagram showing an example of an image after undergoing scale transformation.

FIG. 25 is a diagram showing an example of an image after undergoing the scale transformation. The transformation unit 145 performs the scale transformation on the image 62 as the image A. By this, the target object 20 included in the image 62 becomes smaller.

The above description has been given of the case where the projective transformation is performed on the image A. When the image capturing direction in the image A and the image capturing direction in the background image are the same as each other, the transformation unit 145 does not perform the projective transformation on the image A. Further, the above description has been given of the case where the scale transformation is performed on the image A after undergoing the projective transformation. It is also possible for the transformation unit 145 to perform the scale transformation on the image A that has not undergone the projective transformation.

(Step S53) The selection unit 144 judges whether or not all of the foreground image candidates have been selected. When all of the foreground image candidates have been selected, the process advances to step S54. When not all of the foreground image candidates have been selected, the process advances to the step S42.

(Step S54) The selection unit 144 selects a foreground image candidate that is optimum as the foreground image to be superimposed out of the one or more foreground image candidates. In other words, the selection unit 144 selects an image that minimizes a viewpoint change caused by image transformation out of the one or more foreground image candidates.

Here, an index d(P, Q) representing a similarity level between a rotation matrix P and a rotation matrix Q is introduced. A smaller value of the index d(P, Q) indicates that the rotation matrix P and the rotation matrix Q are more similar to each other. Further, a smaller value of the index d(P, Q) indicates that the viewpoint change is smaller irrespective of a change in the camera posture. The index d(P, Q) can be represented by using expression (18).

$$d(P, Q) = \sqrt{\int |Px - Qx|^2 dx} \tag{18}$$

$x \in$ POINTS ON UNIT SPHERE

The index d(P, Q) is calculated on an ad-hoc basis by randomly sampling points on a unit sphere and calculating the distance between coordinates obtained by transformation by the rotation matrix P and coordinates obtained by transformation by the rotation matrix Q in regard to each of the points.

In the process in which the optimum foreground image candidate is selected, "P" in the index d(P, Q) is replaced with the camera posture $R_A$. Further, "Q" in the index d(P, Q) is replaced with the camera posture $R_B$.

When there exist N sheets of foreground image candidates, the selection unit 144 selects an image i as the optimum foreground image candidate by using expression (19).

$$i = \underset{j \in (1, \ldots, N)}{\arg\min}\, d\left(R_A^{(j)}, R_B\right) \tag{19}$$

(Step S55) The superimposition unit 146 superimposes the selected image i (i.e. foreground image) on the background image. Specifically, the superimposition unit 146 superimposes the foreground image on the superimposition position pp of the background image.

Incidentally, the above description has been given of the case where the projective transformation and the scale transformation are performed on the image A in order to facilitate the understanding. In reality, however, the projective transformation and the scale transformation are performed on the foreground image indicating the target object 20 included in the image A.

An example of a flow from the projective transformation to the superimposition will be described briefly below.

Figure 26:
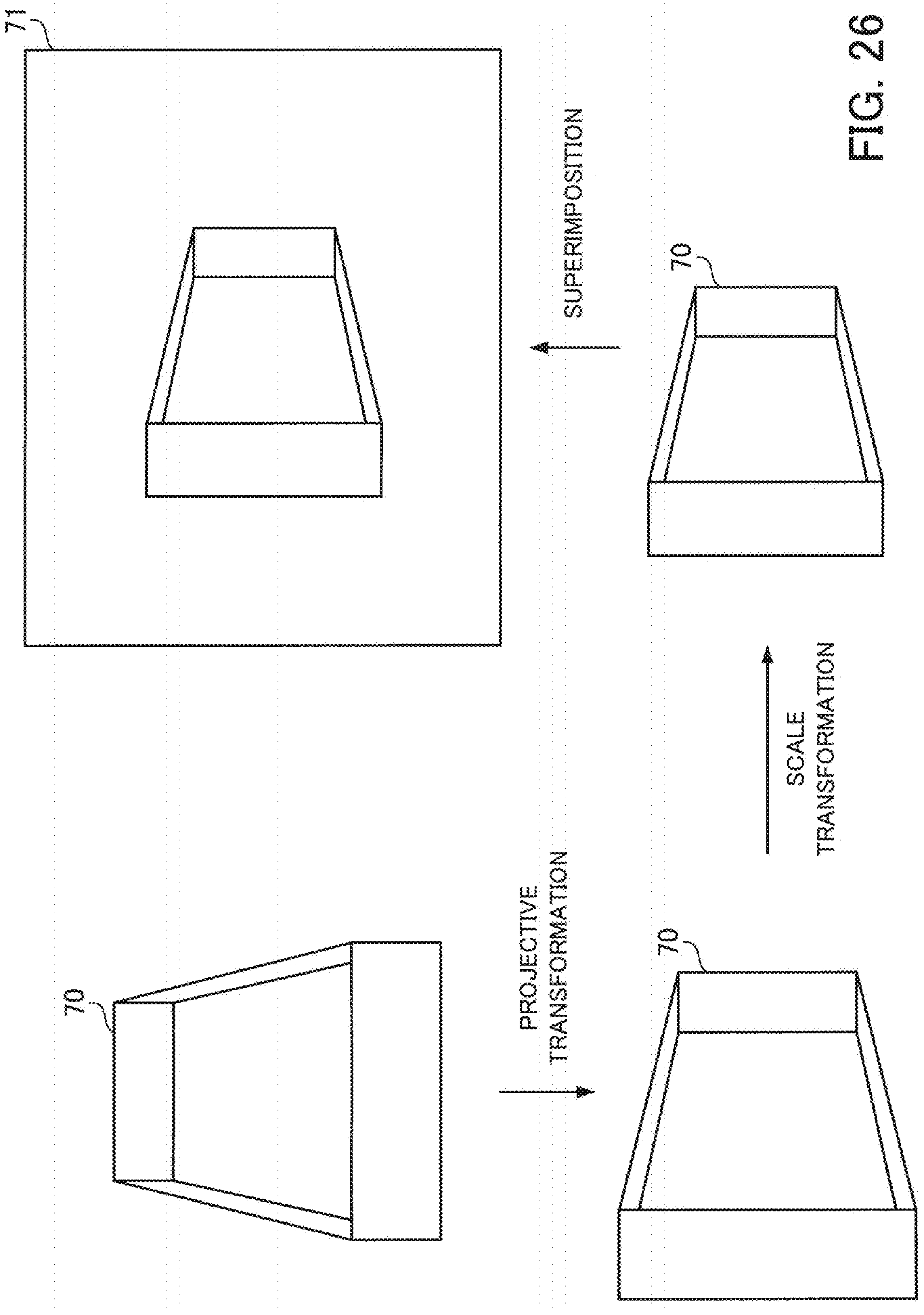
FIG. 26 is a diagram showing a flow from the projective transformation to the superimposition.

FIG. 26 is a diagram showing the flow from the projective transformation to the superimposition. FIG. 26 shows a foreground image 70. The data generation unit 140 performs the projective transformation on the foreground image 70. The data generation unit 140 performs the scale transformation on the foreground image 70. In other words, the data generation unit 140 transforms the scale of the foreground image 70 to the scale of a background image 71. The data generation unit 140 superimposes the foreground image 70 on the background image 71. By this, the combined image is generated. The combined image is used as learning data. Further, information registered in the measurement table 111 may be associated with the combined image. The association of the information with the combined image makes it possible to narrow down the learning data. Further, the association of the information with the combined image makes it possible to extract learning data that corrects a condition imbalance when the condition imbalance has occurred. Furthermore, correct answer information may be associated with the combined image.

The information processing device 100 superimposes a foreground image corresponding to an angle θ equal to or close to the angle $\theta_B$ corresponding to the background image on the background image. Therefore, the combined image obtained by superimposing the foreground image on the background image is formed as realistic data. Thus, the information processing device 100 is capable of generating realistic data.

Further, when the image capturing direction in the foreground image and the image capturing direction in the background image differ from each other, the information processing device 100 performs the projective transformation on the foreground image. By this, the direction of the foreground image becomes the same as the image capturing direction of the background image. Then, the information processing device 100 superimposes the foreground image after undergoing the projective transformation on the background image. Therefore, the combined image obtained by superimposing the foreground image on the background image is formed as more realistic data. Thus, the information processing device 100 is capable of generating more realistic data.

Furthermore, when the scale of the foreground image and the scale of the background image differ from each other, the information processing device 100 performs the scale transformation on the foreground image. By this, the foreground image is transformed to the same scale as the background image. Then, the information processing device 100 superimposes the foreground image after undergoing the scale transformation on the background image. Therefore, the combined image obtained by superimposing the foreground image on the background image is formed as more realistic data. Thus, the information processing device 100 is capable of generating more realistic data.

The information processing device 100 selects a foreground image candidate that is optimum as the foreground image to be superimposed out of a plurality of foreground image candidates. Then, the information processing device 100 superimposes the foreground image as the selected foreground image candidate on the background image. Therefore, the combined image obtained by superimposing the foreground image on the background image is formed as more optimum data. Thus, the information processing device 100 is capable of generating more optimum data.

DESCRIPTION OF REFERENCE CHARACTERS

10: robot arm, 11: camera, 20: target object, 21: target object setting point, 30: belt conveyer, 31: object, 32: camera, 40: image, 41: rectangular region, 42: mask image, 43: foreground image, 50: image, 51: image, 60: image, 61: image, 62: image, 70: foreground image, 71: background image, 100: information processing device, 101: processor, 102: volatile storage device, 103: nonvolatile storage device, 104: input device, 105: display device, 110: storage unit, 111: measurement table, 120: acquisition unit, 130: foreground image generation unit, 131: region calculation unit, 132: mask image generation unit, 133: foreground image generation unit, 140: data generation unit, 141: superimposition position determination unit, 142: calculation unit, 143: search unit, 144: selection unit, 145: transformation unit, 146: superimposition unit

What is claimed is:

1. An information processing device comprising:

acquiring circuitry to acquire a foreground image associated with a foreground image angle and indicating a target object, a background image, point cloud data representing three-dimensional coordinates corresponding to each pixel of the background image, and a camera position when the background image was generated;

superimposition position determining circuitry to determine a superimposition position in the background image;

calculating circuitry to calculate a plane as a region including the superimposition position by using the point cloud data and calculate a background image angle as an angle between a straight line connecting the camera position and the superimposition position and the calculated plane;

transforming circuitry to perform projective transformation on the foreground image in an image capturing direction in the background image so that a camera posture as a rotation matrix corresponding to the foreground image in a world coordinate system becomes equal to a camera posture as a rotation matrix corresponding to the background image in the world coordinate system; and superimposing circuitry to superimpose the foreground image on the background image, wherein the foreground image angle is an angle between a plane on which the target object was set when an original image of the foreground image was generated and a straight line representing an image capturing direction as a direction in which the image of the target object is captured, and is an angle equal to or close to the background image angle.

2. The information processing device according to claim 1 wherein the transforming circuitry performs scale transformation on the foreground image to a scale of the background image.

3. The information processing device according to claim 1, further comprising selecting circuitry, wherein the acquiring circuitry acquires a plurality of foreground image candidates each associated with an angle equal to or close to the background image angle, the selecting circuitry selects a foreground image candidate that is optimum as the foreground image to be superimposed out of the plurality of foreground image candidates, and the foreground image superimposed on the background image is the selected foreground image candidate.

4. A generation method performed by an information processing device, the generation method comprising:

acquiring a background image, point cloud data representing three-dimensional coordinates corresponding to each pixel of the background image, and a camera position when the background image was generated;

determining a superimposition position in the background image;

calculating a plane as a region including the superimposition position by using the point cloud data;

calculating a background image angle as an angle between a straight line connecting the camera position and the superimposition position and the calculated plane;

acquiring a foreground image associated with a foreground image angle as an angle equal to or close to the background image angle and indicating a target object;

performing projective transformation on the foreground image in the image capturing direction in the background image so that a camera posture as a rotation matrix corresponding to the foreground image in a world coordinate system becomes equal to a camera posture as a rotation matrix corresponding to the background image in the world coordinate system; and superimposing the foreground image on the background image, wherein the foreground image angle is an angle between a plane on which the target object was set when an original image of the foreground image was generated and a straight line representing an image capturing direction as a direction in which the image of the target object is captured.

5. An information processing device comprising:

a processor to execute a program; and a memory to store the program which, when executed by the processor, performs processes of, acquiring a background image, point cloud data representing three-dimensional coordinates corresponding to each pixel of the background image, and a camera position when the background image was generated, determining a superimposition position in the background image, calculating a plane as a region including the superimposition position by using the point cloud data, calculating a background image angle as an angle between a straight line connecting the camera position and the superimposition position and the calculated plane, acquiring a foreground image associated with a foreground image angle as an angle equal to or close to the background image angle and indicating a target object, performing projective transformation on the foreground image in the image capturing direction in the background image so that a camera posture as a rotation matrix corresponding to the foreground image in a world coordinate system becomes equal to a camera posture as a rotation matrix corresponding to the background image in the world coordinate system, and superimposing the foreground image on the background image, wherein the foreground image angle is an angle between a plane on which the target object was set when an original image of the foreground image was generated and a straight line representing an image capturing direction as a direction in which the image of the target object is captured.

* * * * *